Figure 1:
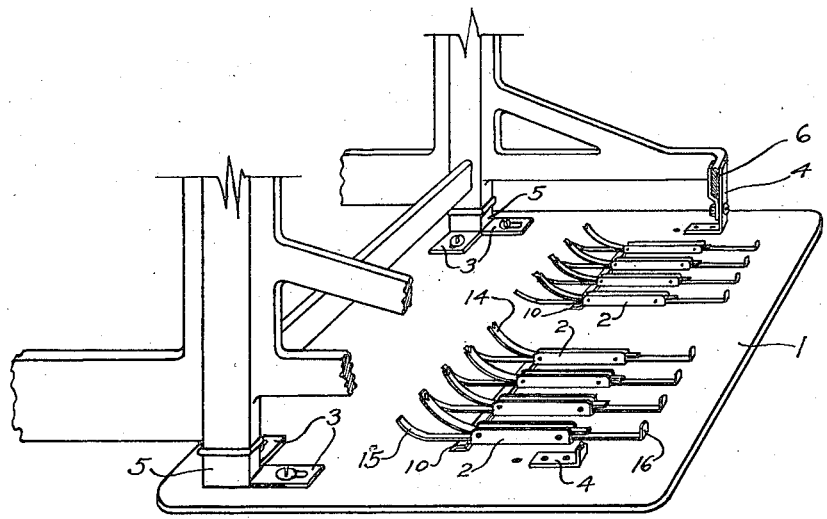

UNITED STATES PATENT OFFICE 2,012,001

MEANS FOR FACILITATING THE TRAINING OF TYPISTS

Alexander H. Fairchild, Birmingham, Ala., assignor of one-half to George N. Lemmon, Homewood, Ala.

Application May 19, 1932, Serial No. 612,174

14 Claims. (Cl. 197—107)

My invention relates to means adapted for use in connection with the keyboard of a typewriter as an aid in increasing the accuracy and speed of a student of touch system of typing. The objects of the invention are, therefore, to aid the teacher in imparting instruction, thereby shortening the term of training of the student; to aid the latter in acquiring the correct position of the hands and fingers; in learning the positions of the keys of the keyboard; in strengthening the fingers so that they may always strike the keys with the same force; and in so coordinating the finger muscles and the brain cells controlling the same as to make possible rapid and unerring typing by the use of all the fingers of both hands.

In typewriting by the touch method, those fingers that are not in action are caused to rest upon certain keys which I shall designate as "home keys". On a standard keyboard, the home keys for the first, second, third, and fourth fingers of the left hand are respectively, $f, d, s, a$; while the home keys of the first, second, third, and fourth fingers of the right hands are respectively $j, k, l, ;$.

The correct position of the hands is with the tips of the fingers pointing downwardly toward the keys, all the fingers slightly bent, the thumbs resting on the space bar, the backs of the hands horizontal transversely of the keyboard but inclined upwardly toward the rear of the latter at the same angle as the key bank and the wrists slightly lower than the knuckles of the hands.

In former methods of teaching typewriting, the entire arm was supported from the shoulder only, and the student was required to hold his arm, wrist, hand and fingers in fixed positions which were unnatural to the beginner. Moreover, while maintaining these unnatural positions, he was required to move the particular finger to be trained from its bent position on its home key to the key to be struck, and to do this without permitting any of the other fingers to move. Thus, at the same instant, one set of nerve impulses were being sent out from the nerve centers to HOLD and another set were being sent out to MOVE. This, in the beginning of the training, resulted in undue expense of energy, brain and muscle fatigue, and uncoordinated and misdirected movements of the hands and fingers. For the average student has not learned to move his fingers independently, and the tendency always is for him to move all his fingers together whenever he tries to move a single finger.

More specifically stated, therefore, it is the purpose of my invention to conserve this energy, to prevent this fatigue and to secure the proper and timely movements of the hands and fingers by locking the home keys against unintended depression.

I further provide a means to release or re-lock without effort, any one or all of the home keys as desired, so that as the student acquires skill he gradually may dispense with the aid of my device, and there will be no abrupt change when it is discarded. I further provide adjustments so that one device can be adapted to almost any standard make of typewriter.

While I realize that my invention may be embodied in many forms, a number of which I have tried out with entire satisfaction, the form shown in the accompanying drawing, is, because of its simplicity and economy in manufacture, the one I now prefer. I wish it understood, however, that the accompanying claims are not intended to be limited thereto any further than their specific terms make obvious and necessary.

Figure 2:
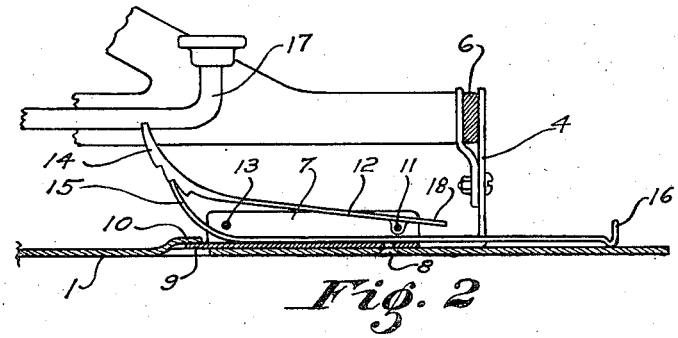
Figure 3:
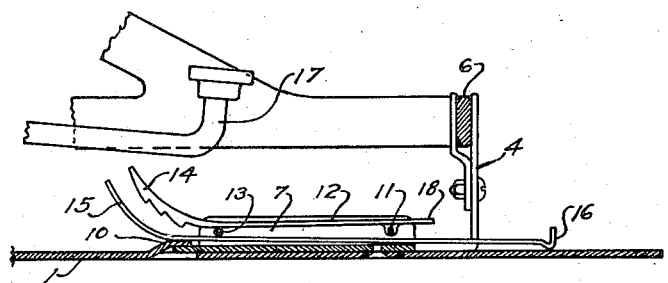

Referring to the drawing, Fig. 1 shows a perspective view of my device; Fig. 2 is a cross-sectional view showing one element in the position of locking the typewriter key; Fig. 3 is similar to Fig. 2, but with the typewriter key unlocked and depressed, as when printing its letter.

Upon a base 1 are attached eight similar sets of members 2. The base is also provided with two sets of adjustable blocks 3; and two adjustable clamps 4. When in use, the adjustable blocks are located so that they fit close to the feet of the typewriter 5, and the clamps 4, are attached to the cross-bar member of the typewriter frame 6, thereby holding the base in a fixed position relative to the typewriter.

Each set of movable members 2, consists of a U-shaped trough 7, pivoted to the base at 8, and having a projection 9 at the other end which fits under a slit and raised portion of the base 10, in such a way that 7 can be moved within a limited range about its pivot 8. The parts are so proportioned that there is sufficient friction to prevent accidental rotation of trough 7 about its pivot 8.

The trough 7 carries two pins 11, 13. About pin 11 is pivoted a locking member 12 which has a notched end 14 that is raised and lowered by the member 15. This member 15 slides back and forth in the trough 7 when so manipulated by the projection 16. The pin 13 serves both as a guide and a stop. If desired, notches can be placed in 14 where it is engaged by 15, to prevent accidental slipping. A projection 18 serves to limit the travel of locking member 12.

When the notched end 14 is raised, as in Fig. 2, the end notch engages with the typewriter key 17 and locks it up. When projection 16 is pushed in, member 15 releases the notched end 14, which drops by gravity, thereby releasing key 17 so that it can be used and depressed in the normal way as shown in Fig. 3.

All standard typewriters are of the same general design, though in different makes of machines there are often slight but important differences in the spaces between some of the keys, and the relative locations of keyboard and frame. The various adjustments of my device can be set so that regardless of the make of the typewriter which is being used, each of the eight notched members 14 locks or releases its proper key when the operator pulls out or pushes in the projection 16.

In use, the student at first pulls out all the stops 16, thereby locking all of the home keys—a, s, d, f —j, k, l, ; the various fingers are then exercised and trained to strike the other keys, as described above. Then, as the student becomes more and more proficient, the home keys are released, one at a time, and in any desired sequence or grouping, until finally all of the home keys are released, and the student is able to manipulate all keys properly without further aid from my device. The device may then be removed and applied to the typewriting machine of another student.

Having thus described my invention and the manner of using the same, what I claim as new and desire to secure by Letters Patent is:

1. As an aid in acquiring skill and accuracy in typewriting, the combination with a typewriting machine having a keyboard, eight of the keys of which are designated as home keys, of means operable at will to hold one only, or any other desired number of the home keys against operation but leaving all other keys of the keyboard free for operation, for the purposes specified.

2. As an aid in acquiring skill and accuracy in typewriting, the combination with a typewriting machine having a keyboard, certain of the keys of which are designated as home keys upon which the operator's fingers normally rest when inactive, of means operable at will to hold all of the said home keys against manual operation, while leaving all other keys of the keyboard free for such operation, for the purposes specified.

3. As an aid in acquiring skill and accuracy in typewriting, the combination with a typewriting machine having a keyboard, certain of the keys of which are designated as home keys upon which the operator's fingers normally rest when inactive, of means operable at will to hold several of the said home keys against manual operation, while leaving all other keys of the keyboard free for such operation, for the purposes specified.

4. As an aid in acquiring skill and accuracy in typewriting, the combination with a typewriting machine having a keyboard, certain of the keys of which are designated as home keys upon which the operator's fingers normally rest when inactive, of means operable at will to hold one of the said home keys against manual operation, while leaving all other keys of the keyboard free for such operation, for the purposes specified.

5. As an aid in acquiring skill and accuracy in typewriting, the combination with a typewriter having a keyboard, certain of the keys of which are designated as home keys, of a multiplicity of locking devices for the said home keys, each of the devices being independently operable to lock or unlock their respective home keys, all the keys of the keyboard which are not home keys being free for operation irrespective of said locking devices, for the purposes specified.

6. As an aid in acquiring skill and accuracy in typewriting, the combination with a typewriting machine having a frame and a keyboard, of a base member held by the frame, and mounted upon the base member a plurality of members movable at will to lock certain only of the keys in the keyboard from operation and to leave the other keys free to operate, for the purpose specified.

7. As an article of manufacture, a removable device placeable beneath the keyboard of a typewriting machine and operable to lock one or more of the home keys of the keyboard against operation while leaving the other keys free to operate.

8. As an article of manufacture a removable device comprising a base member placeable near the keyboard of a typewriting machine, a plurality of locking members mounted upon the base and each movable at will into and out of engagement with a certain key of the said keyboard.

9. As an aid in acquiring skill and accuracy in typewriting, the combination with a typewriting machine keyboard and its stationary supporting frame, certain of the keys of the keyboard being home keys, of a multiplicity of means placeable in fixed relation to the said keyboard and frame for locking at will one or more of the said home keys against operation, leaving all other keys of the keyboard free for operation, for the purpose specified.

10. As an aid in acquiring skill and accuracy in typewriting, the combination with a typewriting machine keyboard and its stationary supporting frame, certain of the keys of the keyboard being home keys, of a multiplicity of means placeable in fixed relation to the said keyboard and frame for locking at will one or more of the said home keys against operation, leaving all other keys free for operation, the said means being readily removable from the typewriting machine, for the purpose specified.

11. As an aid in acquiring skill and accuracy in typewriting, the combination with a typewriting machine keyboard and its stationary supporting frame, certain of the keys of the keyboard being home keys, of a multiplicity of means placeable in fixed relation to the said keyboard and frame for locking at will one or more of the said home keys against operation, leaving all other keys free for operation, the said means being adjustable to suit different typewriting machines, for the purpose specified.

12. As an article of manufacture, a locking device comprising a multiplicity of independent units, placeable in a certain position relative to the home keys of a typewriting machine, the said units being independently moveable at will to lock the corresponding home keys against operation or to release them, as desired, while leaving the other keys free to operate.

13. As an article of manufacture, an adjustable locking device comprising a multiplicity of independent units, placeable in a certain position relative to the home keys of a typewriting machine, the said units being independently movable at will to lock the corresponding home keys against operation or to release them, as desired, while leaving the other keys free to operate.

14. As an aid in acquiring skill and accuracy in typewriting, the combination with a typewriting machine having a keyboard, certain of the keys of which are designated as home keys upon which the operator's fingers normally rest when inactive, of means operable at will to hold at least one of the said home keys against manual operation, while leaving other keys of the keyboard free for such operation, for the purposes specified.

ALEXANDER H. FAIRCHILD.